( 12 ) United States Patent
Tseng

(10) Patent No.: US 9,658,412 B2
(45) Date of Patent: May 23, 2017

(54) OPTICAL COMMUNICATION DEVICE

(71) Applicant: HON HAI PRECISION INDUSTRY CO., LTD., New Taipei (TW)

(72) Inventor: Kuo-Fong Tseng, New Taipei (TW)

(73) Assignee: ScienBizIP Consulting (Shenzhen) Co., Ltd., Shenzhen (CN)

(*) Notice: Subject to any disclaimer, the term of this patent is extended or adjusted under 35 U.S.C. 154(b) by 139 days.

(21) Appl. No.: 14/198,604

(22) Filed: Mar. 6, 2014

(65) Prior Publication Data

US 2014/0254980 A1    Sep. 11, 2014

(30) Foreign Application Priority Data

Mar. 8, 2013    (TW) .................................. 102108329

(51) Int. Cl.
G02B 6/42    (2006.01)
(52) U.S. Cl.
CPC .......... *G02B 6/4214* (2013.01); *G02B 6/4232* (2013.01)
(58) Field of Classification Search
CPC ...... G02B 6/4214; G02B 6/4232; G02B 6/12; G02B 6/12002; G02B 6/12004; G02B 2006/12104; G02B 2006/12121; G02B 2006/12123; G02B 6/42; G02B 6/4204
See application file for complete search history.

(56) References Cited

U.S. PATENT DOCUMENTS

| | | | |
|---|---|---|---|
| 6,687,268 B2 * | 2/2004 | Kitamura | G02B 6/42 372/22 |
| 2014/0206191 A1 * | 7/2014 | Lee | C09K 13/02 438/694 |

FOREIGN PATENT DOCUMENTS

| | | |
|---|---|---|
| CN | 101975981 A | 2/2011 |
| CN | 202617126 U | 12/2012 |
| JP | P2009-288341 A | 12/2009 |

* cited by examiner

*Primary Examiner* — Michelle R Connelly
*Assistant Examiner* — John M Bedtelyon
(74) *Attorney, Agent, or Firm* — Steven Reiss

(57) ABSTRACT

An optical communication device includes a circuit board, a light-emitting element, a light-receiving element, and a planar light guide circuit. The circuit board includes an upper mounting surface. The upper mounting surface defines a groove. The groove includes a first inclined surface and a second inclined surface. The first and the second inclined surfaces are slanted relative to a bottom surface of the groove and connected between the upper mounting surface and the bottom surface. A reflection layer is coated on the first and second inclined surfaces. The light-emitting element includes a light emergent surface, and the light-receiving element includes a light incident surface. The light-emitting element and the light-receiving element are mounted on the upper mounting surface. The planar light guide circuit is received in the groove. Two ends of the planar light guide circuit face reflection layers of the first inclined surface and the second inclined surface, respectively.

7 Claims, 3 Drawing Sheets

OPTICAL COMMUNICATION DEVICE

BACKGROUND

1. Technical Field

The present disclosure relates to optical communication, and particularly to an optical communication device.

2. Description of Related Art

Optical communication devices comprise a circuit board, a light-emitting element, a light-receiving element, a planar light guide circuit, and two optical coupling casings. However, the light-emitting element, the light-receiving element, and the planar light guide circuit are located on the circuit board. Additionally, the light-emitting element and the light-receiving element are covered by the optical coupling casings, which take up a relatively large amount of space, and the planar light guide circuit requires pads to couple to the optical coupling casings. Thus, a size of the optical communication device is relatively large.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Embodiments will now be described in detail below with reference to the appended figures.

Figure 1:
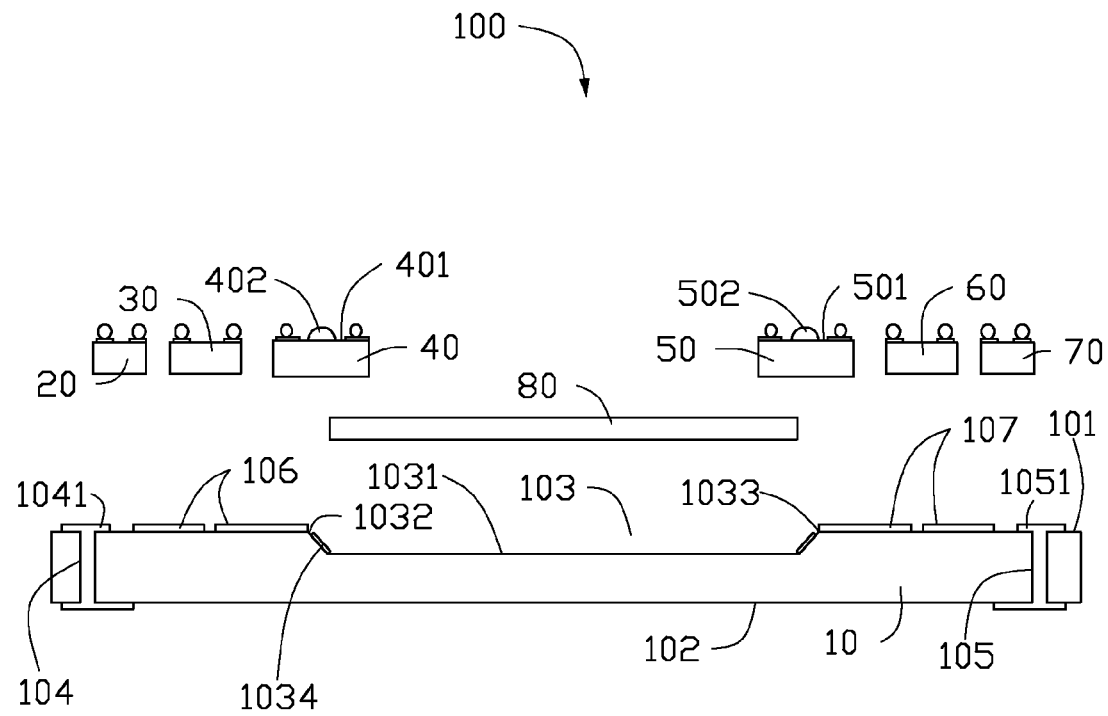
FIG. 1 is a schematic view of an embodiment of an optical communication device.

FIG. 1 is a schematic view of an embodiment of an optical communication device 100. The optical communication device 100 comprises a circuit board 10, a processor 20, a first controller 30, a light-emitting element 40, a light-receiving element 50, a second controller 60, a memory 70, and a planar light guide circuit 80.

The circuit board 10 comprises an upper mounting surface 101 and a lower surface 102. The upper mounting surface 101 defines a groove 103, and at least one first via 104 and at least one second via 105 are defined through the upper mounting surface 101 and lower surface 102. A bottom surface 1031 of the groove 103 is substantially parallel to the upper mounting surface 101. A first inclined surface 1032 and a second inclined surface 1033 of the groove 103 are inclined relative to the bottom surface 1031. Both the first inclined surface 1032 and the second inclined surface 1033 are connected to the upper mounting surface 101 and the bottom surface 1031. In one embodiment, included angles between the upper mounting surface 101 and the first and second inclined surfaces 1032, 1033 are about 135 degrees. The first inclined surface 1032 and the second inclined surface 1033 are coated with a reflection layer 1034. The reflection layer 1034 can be, but is not limited to, gold or nickel. The first via 104 and the second via 105 are defined at opposite sides of the groove 103 and receive conductive material (not shown) to electrically connect to an inner circuit (not shown) of the circuit board 10.

A first soldering pad 1041 and a second soldering pad 1051 are located on the upper mounting surface 101 to electrically connect to the conductive material in the first via 104 and the conductive material in the second via 105, respectively. Two third soldering pads 106 are located between the first soldering pad 1041 and the first inclined surface 1032, and two fourth soldering pads 107 are located between the second soldering pad 1051 and the second inclined surface 1033. The two third soldering pads 106 are spaced from each other, and the two fourth soldering pads are spaced from each other. One third soldering pad 106 is more adjacent to the first inclined surface 1032 than is the other third soldering pad 106, and one fourth soldering pad 107 is more adjacent to the second inclined surface 1033 than is the other fourth soldering pad 107.

Figure 2:
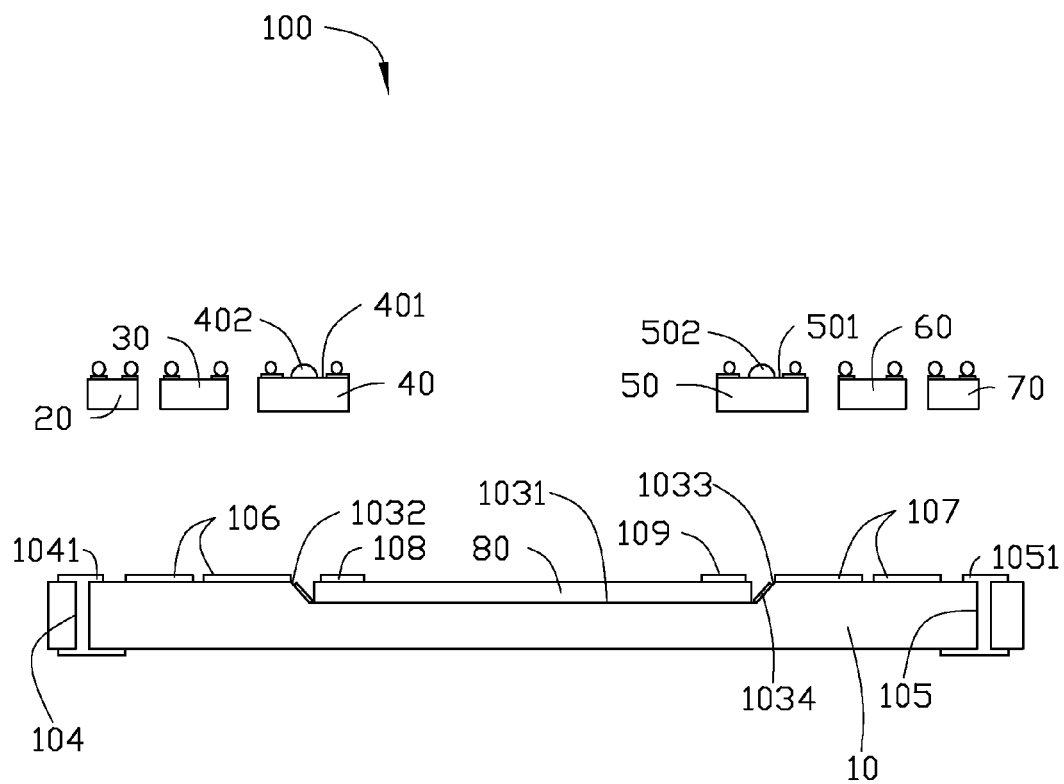
FIG. 2 is a partially assembled view of the optical communication device of FIG. 1.

Referring to FIG. 2, the planar light guide circuit 80 is received in the groove 103 and located on the bottom surface 1031. In one embodiment, included angles between end surfaces of the planar light guide circuit 80 and the first and second inclined surfaces 1032, 1033 are about 45 degrees. The end surfaces of the planar light guide circuit 80 correspond to the reflection layers 1034 of the first inclined surface 1032 and the second inclined surface 1033. In the illustrated embodiment, the planar light guide circuit 80 further comprises a fifth soldering pad 108, which is adjacent to the first inclined surface 1032, and a sixth soldering pad 109, which is adjacent to the second inclined surface 1033.

The light-emitting element 40 comprises a light emergent surface 401 and a hemispheric first condensing part 402. The first condensing part 402 is formed by dropping colloid on the light emergent surface 401. In another embodiment, the first condensing part 402 can be molded separately and pasted onto the light emergent surface 401. In one embodiment, the light-emitting element 40 is a laser diode. The light-receiving element 50 comprises a light incident surface 501 and a hemispheric second condensing part 502. The second condensing part 502 is formed by dropping colloid on the light incident surface. In another embodiment, the second condensing part 502 can be molded separately and pasted onto the light incident surface 501. In one embodiment, the light-receiving element 50 is a photo-diode.

Figure 3:
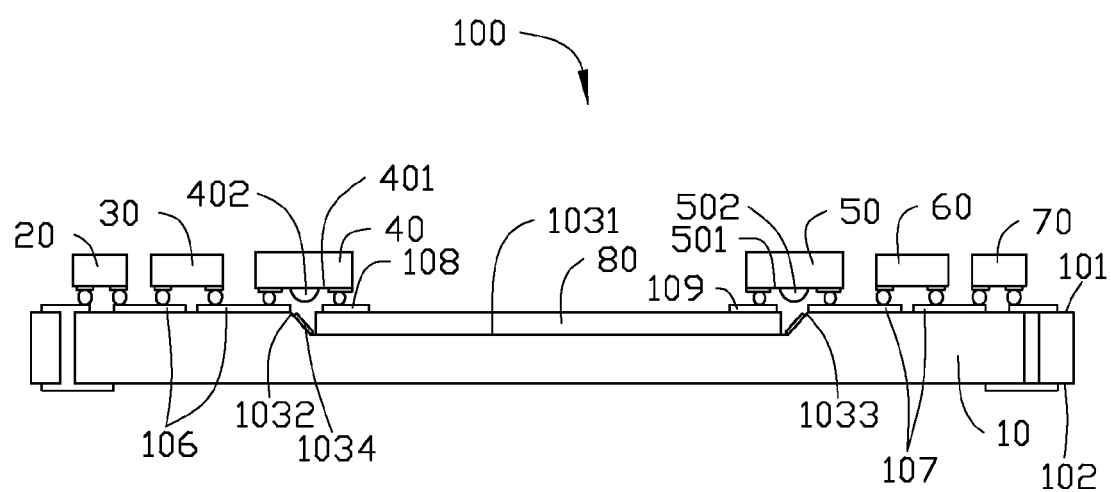
FIG. 3 is an assembled view of the optical communication device of FIG. 1.

Referring to FIGS. 2-3, the light-emitting element 40 electrically connects to the third soldering pad 106 adjacent to the first inclined surface 1032, and the fifth soldering pad 108 by flip chip. In the illustrated embodiment, the first condensing part 402 faces the reflection layer 1034 of the first inclined surface 1032, such that an included angle between a central axis of the first condensing part 402 and the first inclined surface 1032 is about 45 degrees. The light-receiving element 50 electrically connects to the fourth soldering pad 107 adjacent to the second inclined surface 1033, and the sixth soldering pad 109 by flip chip. In the illustrated embodiment, the second condensing part 502 faces the reflection surface 1034 of the second inclined surface 1033, such that an included angle between a central axis of the second condensing part 502 and the second inclined surface 1033 is about 45 degrees.

The processor 20 electrically connects to the third soldering pad 106 away from the first inclined surface 1032, and the first soldering pad 1041 by flip chip. The first controller 30 electrically connects to the two third soldering pads 106 by flip chip. Thus, the light-emitting element 40 electrically connects to the circuit board 10 through the first controller 30, the processor 20, and the first via 104.

The memory 70 electrically connects to the fourth soldering pad 108 away from the second inclined surface 1033, and the second soldering pad 1051 by flip chip. The second controller 60 electrically connects to the two fourth soldering pads 108 by flip chip. Thus, the light-receiving element 50 electrically connects to the circuit board 10 through the second controller 60, the memory 70, and the second via 105.

In use, the processor 20 sends a stimulating signal to the first controller 30. When the first controller 30 receives the stimulating signal, the first controller 30 sends a corresponding trigger signal to the light-emitting element 40 to make light emit from the light emergent surface 401 of the light-emitting element 40. The emitted light from the light-emitting element 40 is condensed by the first condensing part 402 and reflected by the reflection layer 1034 of the first inclined surface 1032. The reflected light enters the planar light guide circuit 80 and travels to the reflection layer 1034 of the second inclined surface 1033. The reflection layer 1034 of the second inclined surface 1033 reflects the light to the second condensing part 502 of the light-receiving element 50. The condensed light is projected onto the light incident surface 501, and the light-receiving element 50 converts the light into electrical signals. The light-receiving element 50 transmits the electrical signals to the second controller 60 to execute an amplification process. The electrical signals processed by the second controller 60 are stored in the memory 70.

In another embodiment, the fifth soldering pad 108 and the sixth soldering pad 109 can be located on the upper mounting surface 101 instead of on the planar light guide circuit 80.

The planar light guide circuit 80 is received in the groove 103 instead of being located on the upper mounting surface 101. Additionally, the first condensing part 402 and the second condensing part 502 are located on the light emergent surface 401 and the light incident surface 501, respectively. Thus, a size of the optical communication device 100 is greatly reduced.

The above-mentioned embodiments of the present disclosure are intended to be illustrative only. Persons skilled in the art may devise numerous alternative embodiments without departing from the scope of the following claims.

What is claimed is:

1. An optical communication device, comprising:
    a circuit board which comprises an upper mounting surface;
    a light-emitting element which comprises a light emergent surface;
    a light-receiving element which comprises a light incident surface; and
    a planar light guide circuit;
    wherein a groove is defined in the upper mounting surface, the groove comprises a bottom surface, a first inclined surface, and a second inclined surface, and the first inclined surface and the second inclined surface are both connected to the upper mounting surface and the bottom surface, the first inclined surface and the second inclined surface are both coated with a reflection layer;
    wherein a first condensing part is positioned on the light emergent surface, the light-emitting element is mounted on the upper mounting surface, and the first condensing part faces the reflection layer of the first inclined surface;
    wherein a second condensing part is positioned on the light incident surface, the light-receiving element is mounted on the upper mounting surface, and the second condensing part faces the reflection layer of the second inclined surface;
    wherein the planar light guide circuit is received in the groove, located on the bottom surface, and directly attached to the bottom surface, wherein end surfaces of the planar light guide circuit face the reflection layers of the first inclined surface and the second inclined surface;
    wherein light from the light-emitting element is condensed by the first condensing part and reflected by the reflection layer of the first inclined surface, the reflected light enters the planar light guide circuit and travels to the reflection layer of the second inclined surface, then the reflection layer of the second inclined surface reflects the light to the second condensing part and the condensed light is projected onto the light incident surface;
    wherein the optical communication device further comprises a processor, a first controller, a memory, and a second controller, the processor, the first controller, the memory, and the second controller are located on the upper mounting surface, the processor sends a stimulating signal to the first controller, the first controller sends a trigger signal based on the stimulating signal to the light-emitting element to trigger the light-emitting element to emit the light, the light-receiving element converts the light into electrical signals and transmits the electrical signal to the second controller, the second controller amplifies the electrical signals and stores the amplified electrical signals into the memory;
    wherein at least one first via and at least one second via are defined in the upper mounting surface, each of the at least one first via and the at least one second via receives a conductive material, the upper mounting surface defines a first soldering pad, a second soldering pad, two third soldering pads, and two fourth soldering pads, the first soldering pad is electrically connected to the conductive material through the at least one first via, the second soldering pad is electrically connected the conductive material through the at least one second via, the two third soldering pads are positioned between the first soldering pad and the first inclined surface, the two fourth soldering pads are positioned between the second soldering pad and the second inclined surface, wherein the processor is electrically connected to the first soldering pad and one of the third soldering pads adjacent to the first soldering pad, the first controller is electrically connected to the two third soldering pads, the memory is electrically connected to the second soldering pad and one of the fourth soldering pads adjacent to the second soldering pad, and the second controller is electrically connected to the two fourth soldering pads.

2. The optical communication device as claimed in claim 1, wherein the bottom surface is parallel to the upper mounting surface, an angle between the planar light guide circuit and the first inclined surface and an included angle between the planar light guide circuit and the second inclined surface are both 45 degrees, an included angle between the central axis of the first condensing part and the first inclined surface is 45 degrees, and an included angle between the central axis of the second condensing part and the second inclined surface is 45 degrees.

3. The optical communication device as claimed in claim 2, wherein the first condensing part and the second condensing part are hemispherical.

4. The optical communication device as claimed in claim 2, wherein the angle between each end surface of the planar light guide circuit and the reflection layer on either the first inclined surface or the second inclined surface is 45 degrees.

5. The optical communication device as claimed in claim 1, wherein the planar light guide circuit comprises a fifth soldering pad and a sixth soldering pad, the fifth soldering pad adjacent to the first inclined surface, the sixth soldering pad adjacent to the second inclined surface, the light-emitting element is electrically connected to the fifth soldering pad and the other third soldering pad, the light-receiving element is electrically connected to the sixth soldering pad and the other fourth soldering pad.

6. The optical communication device as claimed in claim 1, wherein the light-emitting element is a laser diode, and the light-receiving element is a photo-diode.

7. The optical communication device as claimed in claim 1, wherein the reflection layer is made of gold or nickel.

* * * * *